Feb. 22, 1949.                    O. TALLAKSEN                    2,462,437
ARTIFICIAL FISH BAIT
Filed March 3, 1947
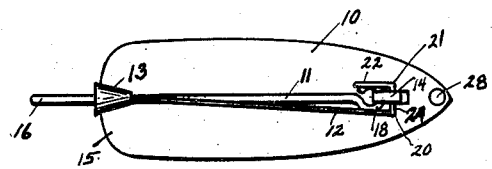
Fig. I.
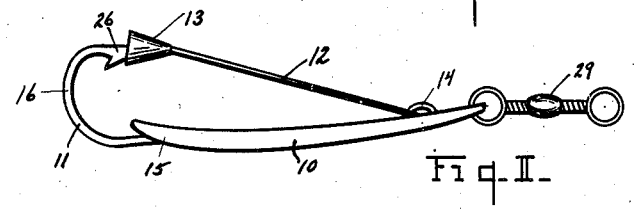
Fig. II.
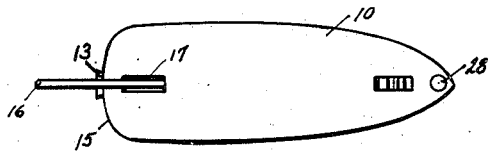
Fig. III.
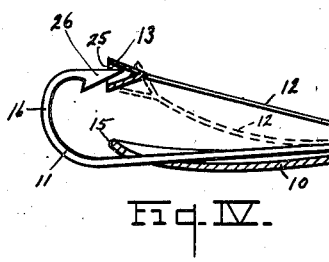
Fig. IV.
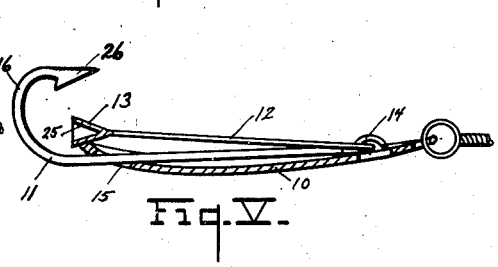
Fig. V.
INVENTOR.
BY OLAF TALLAKSEN.
Joseph B. Lindecker
ATT'Y.

Patented Feb. 22, 1949

2,462,437

UNITED STATES PATENT OFFICE 2,462,437

ARTIFICIAL FISH BAIT

Olaf Tallaksen, Chicago, Ill.

Application March 3, 1947, Serial No. 732,050

5 Claims. (Cl. 43—39)

This invention relates to artificial fish baits and more particularly to fish lures for game fish such as bass, pike, muskellunge and so forth.

These game fish are frequently found around weed beds, sunken logs, submerged snags, etc., where they are constantly in search of food consisting of flies and bugs which fall on the water, and also crawfish, minnows and the like in the water. This necessitates the use of a lure having embodied therewith what is known as a "weedless hook."

There are many different kinds of artificial baits on the market and in use today, such as buck-tails, spoons, wooden plugs, etc., these baits after being cast and retrieved wobble or return in a zig-zag manner, said baits are either what is known as "floaters" or "non-floaters." Floating type baits have specific advantages as well as the non-floating type.

The above mentioned baits when provided with unprotected hooks become entangled and snagged in the under-water obstructions in weed-beds, etc., causing much annoyance and oftentimes even the loss of the bait. Game fish in different localities apparently require or desire different kinds and types of baits, also different kinds of game fish require various kinds of lures in order to tempt them to strike. With the use of the lures found on the market today the fisherman must, in order to catch various kind of fish, he must use various type baits.

It is therefore an object of this invention to provide an artificial fish bait which will eliminate to a very large degree the above noted objections and disadvantages by providing a bait that is weedless and may be cast among sunken logs, snags and so forth with little or no danger of the hook being caught in these obstructions.

A still further object of the invention is to provide a bait in which the hook on the spoon is provided with a hook-guard extending substantially from the forward end of the shank of the hook to the point of the hook, so that it will rest upon said point and cover the point of the hook to prevent direct engagement of weeds with said point of said hook, as well as to assist the hook in turning away from and avoiding weeds and like obstructions with which it may come in contact. Prior to this invention the weed-guard of every hook of the weedless type has been either a spring-guard, or a spring actuated guard; said types when stiff enough to serve the purpose of guarding against the hooking of weeds, and the like, are generally stiff enough to interfere with the proper hooking of the fish. The hook-guard provided disclosed herewith with this novel bait protects the point by the use of a conical hollow head at one end of a flexible wire guard or the like, the other end of said guard being hingedly attached to the spoon, or shank end of the hook, said hollow head resting upon and entirely enclosing the point of the hook. This type of guard gives all the advantages of the spring-guard type and retains all the advantages to the bait of an ordinary unguarded hook by reason of the guard yielding readily to pressure, and remaining away from said point so that it does not exert any pressure in any direction once it is removed from the point of the hook.

With these and other objects in view, the invention consists in the novel combination and arrangement of parts which will be fully set forth in the following specification and accompanying drawings in which:

Figure I is a plan view of the device from its concave or so-called "inner" side;

Figure II is a side elevational view of said device turned with its convex side downward;

Figure III is a plan view of the device from its convex or so-called "outer" side;

Figure IV is a longitudinal section view corresponding to Figure II, taken substantially axially of the device, and with the weed-guard resting upon the pointed end of the stationary hook;

Figure V is a sectional view similar to Figure IV showing the weed-guard resting against the inner-side of the spoon and away from the point of the stationary hook.

Referring to the drawing Figures I to V inclusive indicates a spoon 10 of any desired form having its stationary hook 11 provided with a spring guard wire 12 carrying a conical guard 13, said hook 11 secured at the forward end of the spoon 10 by lug or curved finger 14 extending upwardly from the concave side or face of the body of said spoon 10. Said hook 11 extending rearwardly, from said lug 14, longitudinally over the concave (inner) side of the spoon through its tail portion 15 to the convex (outer) side thereof and with the bent portion 16 of the hook curving upwardly back and over said concave side of the spoon. The hook is applied by passing its point 26 and curved portion 16 through the slot 17 from the concave to the convex side of the spoon, and engaging the eyelet 18 of the hook over the lug or finger 14 before said lug is pressed downwardly and substantially in contact with the inner face of the spoon. The forward end of the guard wire 12 is formed with substantially right angular bends 20 and 21, forming end portion 22 and central portion 24; said portion 24 being hingedly secured to the spoon by said lug or finger 14. The free end or rearward end of the guard wire 12 having secured thereto an enlarged bell-shaped guard, hollow bead or conical guard 13, the interior 25 of said guard 13 resting directly upon the point 26 formed adjacent the curved portion 16 of hook 11. This guard 13 when resting in contact with the point 26, being the sole means of supporting the spring guard wire upwardly away from said spoon. Should said guard wire 12 be forced in any direction by the mouth of a fish, it yields readily and the conical guard 13 is drawn forwardly enough to slide off the point 26 of hook 11, and said wire 12 dropping downwardly into the position shown by Figure V.

The spoon 10 shown in Figures I to V is formed with a hole or other opening 28, as shown clearly in Figure III, to receive a connecting link or swivel 29 for attaching the end of a fishing line.

In the operation of this lure the weed-guard 13 serves the purpose of guarding against the hooking of weeds. In service, the guard 13 is placed in contact with the point 26 of hook 11. When a fish takes the hook and its jaws close down thereon, the wire 12 will be easily flexed and bent downwardly, allowing the conical guard 13 to slip off the point 26, said wire 12 and guard 13 taking the position as shown in Figure V, offering no resistance to the taking of the hooks by the fish, the wire 12 remaining substantially in whatever position it is forced to by pressure. Each time a fish is caught the guard 13 must be reset, therefore the wire 12 must be flexed or bent away from the point 26 of the hook so that conical guard 13 may be placed upon and entirely over and around said point 26. The advantages of this type weed-guard are so great compared to former types that they offset any disadvantage that it must be reset. No guard has ever been known to have these novel features of completely surrounding the hook point and resting thereon until removed, this action being obtained by a device free of springs and non-elastic guard members.

In accordance with the patent statutes I have described the preferred form of the invention, but inasmuch as various changes may be made in the details of construction without departing from the spirit of the invention all such changes are intended to be included within the scope of the appended claims.

What I claim is:

1. In a fishing lure, a body member having an eye intermediate the ends thereof, and a slot adjacent an end thereof, a hook extending through the slot and provided with an eye at one end of its shank secured to the first eye, and a guard of resilient material having an eye at one end freely pivoted on the eye of the body and a conical formation at its opposite end adapted to be maintained in a guard relation with the pointed end of the hook, whereby when a fish bites on the hook and pushes the guard out of its engaged relation with the point, the guard will become deformed from its original shape and will move to a position on the body where the cone shape portion thereof will contact an edge portion of the body of the lure, said conical formation having an inner wall surface thereof in only single point gravity urged supporting contact on the hook.

2. In a fishing lure, a body member having an eye intermediate the front and rear ends thereof, a hook extending rearwardly and upwardly beyond the rear end of the body, said hook provided with an eye at one end of its shank secured to said eye of the body, and a guard of resilient material having an eye at one end freely pivoted to the eye of the body and a conical formation at its opposite end adapted to be maintained in a guard relation with the pointed end of the hook, whereby when a fish bites on the hook and pushes the guard out of its engaged relation with the point, the guard will become deformed from its original shape and will move to a position on the body where the cone shape portion thereof will contact an upper portion of said body of the lure, said conical formation having an inner wall surface thereof in only single point gravity urged supporting contact on the hook.

3. In a fishing lure, a body member having an eye intermediate the front and rear ends thereof, a hook extending rearwardly beyond the rear end of the body, said hook provided with an eye at one end of its shank secured to the body, and a guard of resilient material having an eye at one end freely pivoted on the eye of the body and a conical member at its opposite end adapted to be maintained in a guard relation with the pointed end of the hook, whereby when a fish bites on the lure and pushes the guard out of its engaged relation with the point, the guard will become deformed from its original shape and will allow the conical member to fall downwardly, said conical member having an inner wall surface thereof in only single point gravity urged supporting contact on the hook.

4. The combination with a spoon type fish lure having a body member with an eye intermediate the ends thereof, of a fish hook having one end of its shank secured to said body member, said hook including a point at its free end, and a flexible wire guard pivotally secured at one end to said eye on said body and terminating at its opposite free end with a hollow cone-shaped member, said cone shaped member capable of contacting said point and covering the point of the hook when in contact therewith, whereby when a fish bites on the lure and pushes the guard out of its engaged relation with the point, the guard will become deformed from its original shape and will allow the conical member to fall downwardly, said conical member having an inner wall surface thereof in only single point gravity urged supporting contact on the hook.

5. The combination of a fish lure having a body member with an eye intermediate the ends thereof, a hook secured to said body member, said hook having a pointed end, and a flexible guide having one end pivotally secured to said eye, said guide terminating at its free end with a hollow conical head, said head capable of contacting and surrounding the point of said hook when in service position for fishing, whereby when a fish bites on the lure and pushes the guard out of its engaged relation with the point, the guard will become deformed from its original shape and will allow the conical member to fall downwardly, said conical member having an inner wall surface thereof in only single point gravity urged supporting contact on the hook.

OLAF TALLAKSEN.

REFERENCES CITED

The following references are of record in the file of this patent:

UNITED STATES PATENTS

| Number | Name | Date |
|---|---|---|
| 828,964 | Phelps | Aug. 21, 1906 |
| 1,315,408 | Rabbeth | Sept. 9, 1919 |
| 1,873,289 | Clark | Aug. 23, 1932 |
| 2,123,598 | Eliason | July 12, 1938 |
| 2,255,222 | Leusch | Sept. 9, 1941 |
| 2,414,425 | Tallaksen | Jan. 14, 1947 |